May 11, 1965
R. C. HOWARD
3,183,440
SERVO TEST SYSTEM WITH COMPONENT RESOLVER
Filed Aug. 29, 1960
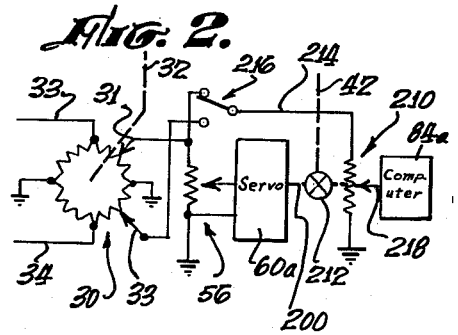
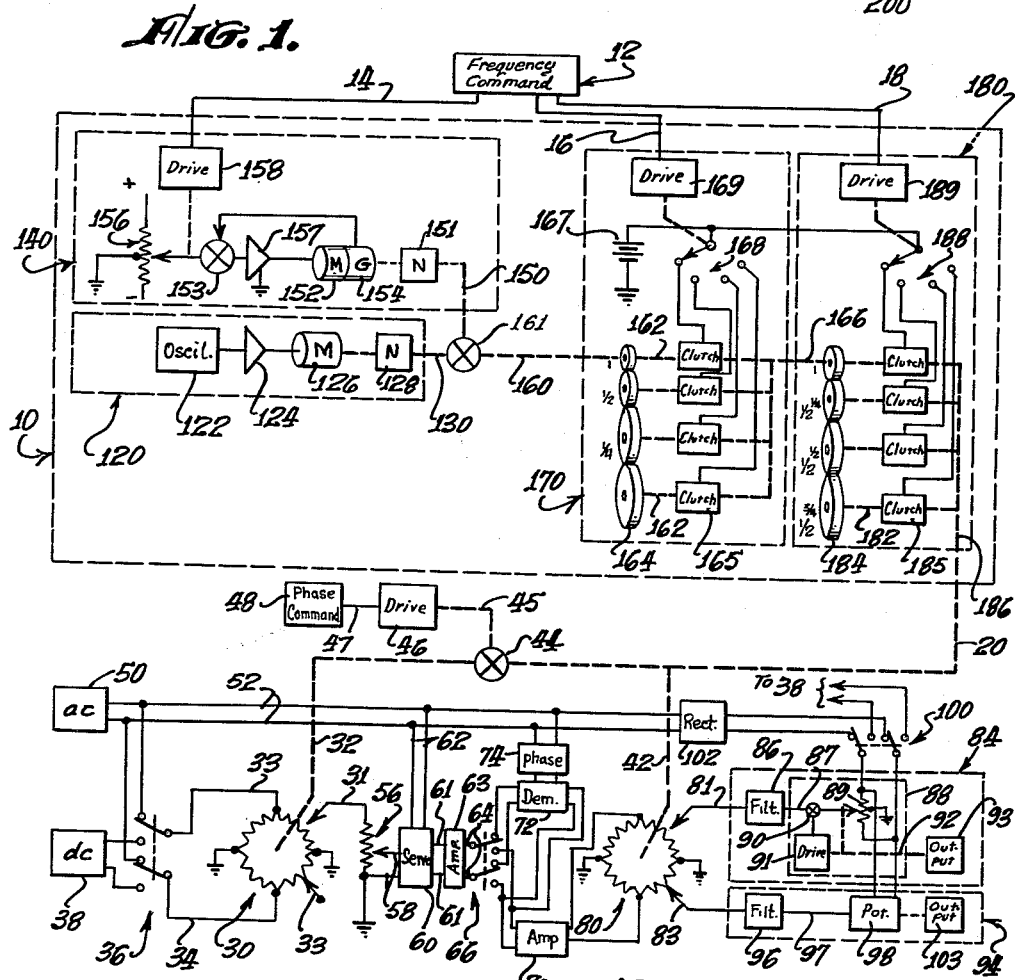
Robert Charles Howard,
INVENTOR.
BY
Barlow & Lewis

United States Patent Office 3,183,440
Patented May 11, 1965

3,183,440
SERVO TEST SYSTEM WITH COMPONENT
RESOLVER
Robert Charles Howard, Costa Mesa, Calif., assignor to
Giannini Controls Corporation, Duarte, Calif., a corporation of New York
Filed Aug. 29, 1960, Ser. No. 52,601
7 Claims. (Cl. 324—158)

This invention has to do with test apparatus for analyzing the performance of control equipment such as servo control systems.

Such systems typically receive an input command signal in electrical form and drive an output member in accordance with variations of that command signal. The output of the control system is sometimes conveniently obtainable as the actual position of the output member; or that position can be represented by an electrical output signal, such as a balance voltage derived from the balance device within the servo.

A primary purpose of the invention is to provide means for supplying to a servo system or the like a command signal of desired frequency and amplitude; and for analyzing the response of the system to that signal.

A more particular object of the invention is to provide means for generating a sinusoidal command signal and for accurately and conveniently controlling the signal frequency over a relatively wide range of test frequency. That aspect of the invention is particularly well adapted for permitting control of the test signal frequency from a remote location.

A further aspect of the invention provides particularly effective and reliable means for analyzing the output of the system under test. In preferred form of the invention, the output is resolved into two components, one in phase with the test signal and one 90° out of phase with the test signal. The amplitudes of the in-phase and out-of-phase components are computed by separate channels, and may be indicated, recorded or otherwise utilized as desired.

The invention provides a servo analyzing system that is especially rugged and reliable in operation, and is therefore well suited for field use, particularly where remote control in accordance with an automatically operated program is required. Such uses include, for example, checkout of control systems in missiles, whether airborne, shipborne or land based.

One aspect of the invention provides mechanism for controllably varying the test frequency in an effectively continuous manner with high accuracy over a wide range. A particular advantage of that mechanism is that it combines extreme accuracy of frequency definition with ease and flexibility of selection. The mechanism is remarkably well adapted for remote control and for automatic control in accordance with a pre-arranged program, as by punched tape or the like.

A further important feature of the invention provides the test frequency control in the form of a rotating shaft which drives two electromechanical modulating devices of suitable type, adapted to modulate an input voltage by a sinusoidal function of an input angle. Those devices are preferably capable of handling directly the relatively low test frequencies that are typically desired for testing control systems. For that purpose sine-cosine potentiometers are particularly convenient and effective.

One of the two modulating devices that are driven at the selected test frequency is caused to modulate a suitable reference voltage, which may be either alternating or direct current as required by the particular servo under test, to povide directly a test voltage for supply to the servo. The other modulating device is caused to modulate the output voltage obtained from the servo. If the servo output voltage includes an alternating current carrier, that carrier is removed by suitable demodulation with attention to carrier phase. The resulting modulated output voltage is then supplied to measuring circuitry responsive to the average value of the voltage. That average constitutes a useful measure of the servo response, the significance of that measure depending upon the phase relation that is maintained between the two electromechanical modulating devices.

When those devices are driven in phase with each other, the described average voltage represents the in-phase component of the servo response. When the modulating devices are driven 90° out of phase, the averaged voltage represents the out-of-phase component of the servo response. An advantage in using a sine-cosine potentiometer as output modulating device is that both in-phase and out-of-phase components can be developed and measured simultaneously by parallel measuring channels connected, respectively, to the sine and cosine output terminals of the potentiometer.

In accordance with a further aspect of the invention, when the response of the servo system under test is intended to have a specified phase difference from the input test frequency, any departure from that phase difference can be indicated directly. That is done by introducing the specified phase difference, for example as an angle between the two driven modulating devices. The averaged out-of-phase signal then provides a measure of the phase error of the servo system; and the averaged in-phase signal provides a measure of the amplitude of the servo response.

A further aspect of the invention relates to simplified means for sinusoidally modulating the servo output when that is available in mechanical form, such as a shaft rotation.

A full understanding of the invention and of its further objects and advantages will be had from the following description of certain illustrative manners in which it may be carried out. The particulars of that description, and of the accompanying drawings which form part of it, are intended only as illustration, and not as a limitation upon the scope of the invention, which is defined in the appended claims.

In the drawings:

FIG. 1 is a schematic drawing representing an illustrative embodiment of the invention; and FIG. 2 is a fragmentary schematic drawing representing a modification.

In the illustrative system of FIG. 1, frequency control mechanism, indicated generally by the numeral 10, drives a shaft, shown schematically at 20. The rate of rotation of shaft 20 is controlled from suitable frequency command mechanism, shown schematically at 12, which may be positioned remotely from mechanism 10. Three distinct channels of control typically extend from command mechanism 12 to control mechanism 10, indicated at 14, 16 and 18. The respective functions of those channels will be described below.

Shaft 20 drives the two electromechanical modulating mechanisms 30 and 80 shown schematically as sine-cosine potentiometers. The driving connections between frequency shaft 20 and potentiometers 30 and 80 are indicated schematically at 32 and 42, respectively. Mechanism of any desired type is preferably provided for controlling the mutual phase relation of the two potentiometers. Such mechanism may, for example, comprise means for rotatably adjusting the case of one of the potentiometers with respect to its rotating element. In the illustrative system of FIG. 1, a mechanical differential is connected between drive connections 32 and 42, as indicated schematically at 44. The differential action of device 44 is controlled by the shaft 45, rotation of which through a given angle introduces a corresponding phase angle between drive connections 32 and 42. Shaft 45 is typically driven by suitable means indicated at 46, in response to an electrical signal supplied via the line 47 from the phase command mechanism indicated schematically at 48. Phase command mechanism 48 is typically associated spacially with frequency command mechanism 12, and may be controlled in common wtih it by any desired programming system.

A suitable reference voltage is supplied to potentiometer 30 via the lines 33 and 34. Any desired means may be provided for controlling the nature of that reference voltage. Such means are represented in the present embodiment by the double-throw switch 36, whereby lines 33 and 34 may be connected alternatively to a source 38 of constant direct current voltage or to a source of constant alternating current carrier voltage, indicated schematically at 50 with carrier supply lines 52.

In the present embodiment, only the sine output at 31 from sine-cosine potentiometer is utilized, the cosine output at 33 remaining open. The amplitude of the sine output at 31 is preferably adjustable, as by the potentiometer 56, and is then supplied via the lines 58 as test signal to the servo system or other control device under test, indicated schematically at 60. An isolation amplifier or other suitable means, not explicitly shown, may be inserted between sine output 31 and potentiometer 56 to eliminate error from loading, if required. If servo 60 utilizes an input signal of suppressed carrier alternating current type, switch 36 is set in its upper position, as shown, and the servo carrier reference circuits are connected via the lines 62 to carrier supply lines 52. Carrier source 50 may represent an external source of any desired type, or may represent a carrier source that forms a part of the servo system 60 under test.

The output from servo 60 on the lines 61 represents the response of the servo to the input test signal on lines 58. That output signal is supplied via the optional isolation amplifier 63, which prevents undue loading of the servo, to the double-throw switch 66. Switch 66 supplies the signal either directly to the amplifier 70, or through the phase sensitive demodulator 72 to that amplifier. Demodulator 72, which may be of conventional type, removes the carrier frequency from the servo output signal. The carrier reference voltage to demodulator 72 is supplied from carrier supply lines 52 via the phase adjusting circuit represented schematically at 74. That phase adjustment permits compensaton for any carrier phase shift that may result from elements within servo 60 or elsewhere in the circuitry. Amplifier 70 preferably includes a gain adjustment that operates over a wide range and is accurately calibrated in terms of overall gain of the system by which the servo output is processed.

The amplified output signal from amplifier 70 is supplied as reference voltage to an electromechanical modulator, typically comprising the sine-cosine potentiometer 80. Potentiometer 80 is driven, as already described, in definite but preferably adjustable phase relation with respect to input potentiometer 30. The sine output on line 81 from potentiometer 80 and the cosine output on line 83 are supplied to separate computing channels, indicated generally at 84 and 94, respectively. In-phase channel 84 comprises typically a low-pass filter or equivalent device 86 adapted to average the sine output from 81, effectively removing from it all frequency components not appreciably lower than twice the test frequency; and means 88 for evaluating the resulting averaged signal. For the usual range of test frequencies, averaging device 86 can comprise a low-pass filter network of conventional form. For particularly low test frequencies, for example less than one cycle per second, the inherently slow response of such networks may be avoided by using an averaging peak-and-trough meter, for example, though this can insert error if the output from servo 60 is nonsinusoidal.

Evaluating means 88 typically comprises a self-balancing potentiometer, with its winding 89 supplied with a direct current reference voltage derived from the same power source that controls the action of the servo under test. Such reference voltage may be obtained via the switch 100 either from direct current source 38 or from carrier supply lines 52 via the proportional rectifier indicated schematically at 102. The voltage tapped from potentiometer winding 89 is compared with the averaged signal on line 87 by a suitable differential device 90, and the resulting difference voltage is supplied to a servo control 91 of conventional form. Control 91 drives the potentiometer to null the difference voltage, producing an output signal that is a measure of the input at 87. That output, represented schematically at 92, drives an output device 93 which may, for example, comprise a digital recorder.

Cosine channel 94 may be substantially identical with channel 84, comprising the averaging device 96, the self-balancing potentiometer 98 and output device 103.

Frequency control mechanism 10, as illustratively represented in FIG. 1, comprises four principal portions, each of which contributes significantly to the overall accuracy flexibility and convenience of operation. Mechanism 10 drives main control shaft 20, already described, at a precisely defined but flexibly variable speed.

The source of primary reference frequency 120 typically comprises the tuning fork oscillator 122 or other source of accurately stabilized frequency, the power amplifier 124 and the synchronous motor 126, which drives the shaft 130 via a suitable gear reduction 128 at a speed directly related to the oscillator frequency. Amplifier 124 may be considered to include suitable frequency dividing or frequency multiplying circuits to provide the desired ratio between oscillator frequency and motor speed.

Mechanism indicated generally by the numeral 140 permits accurate continuous variation of main shaft 20 over a relatively small range of variation. That mechanism comprises an auxiliary shaft represented schematically at 150, means of any desired type for driving shaft 150 at a continuously variable speed, and differential gearing, represented schematically at 161, by which a third shaft 160 is driven at a speed equal to the algebraic sum of the speeds of shafts 130 and 150. Shaft 150 may be driven for example, by a rate servo which typically comprises the motor 152 driving through the gear reduction 151. Motor 152 also drives the tachometer generator 154. The output of generator 154 is compared by differential device 153 to a command signal developed at the wiper of the potentiometer 156. The difference signal from device 153 is amplified by the servo amplifier 157 and supplies driving power to motor 152. The position of the potentiometer wiper is continuously variable by control means of any suitable type, indicated schematically at 158, in response to a control signal supplied over line 14 from frequency command mechanism 12. Alternatively, potentiometer 156 and the reference voltage supply to it may form part of command mechanism 12, the signal from the potentiometer wiper being transmitted via line 14 to differential device 153.

Shaft 160 drives output shaft 20 via two series connected multi-speed gear trains, indicated generally at 170 and 180. Gear train 170 comprises a plurality of shafts 162, driven from shaft 160 by intermeshing gears 164 at respective speeds which form a geometrical series. The ratio $r$ of that geometrical series, that is, the ratio of the speed of one shaft to the speed of the next slower shaft, is typically an integer greater than unity, for example 2. Each shaft 162 drives an electrically actuable clutch 165, typically of known electromagnetic type, by which it may be selectively connected to the output shaft 166. The selected clutch is typically energized by power from the battery 167 supplied via the step switch 168. Switch 168 may be controlled remotely by mechanism indicated at 169 in response to a control signal of any desired type developed in frequency command mechanism 12 and supplied via line 16. Alternatively, switch 168 may form part of command mechanism 12, line 16 being then replaced by an appropriate number of lines for the respective clutches 164. Any desired number of shafts 162 may be provided, depending upon the speed ratio between them and the total speed range required. For example, with speed ratio 2 and with six shafts 162, an overall speed range of 32-fold is available.

For maximum precision of speed selection, the second gear train 180 provides discrete steps which cover the range between adjacent steps of gear train 160. Gear train 180 is typically similar to gear train 160, comprising shafts 182 driven by gears 184 and connectible via electrically actuable clutches 185 to the output shaft 186. Shaft 186 may be directly connected to final output shaft 20, already described. Clutches 185 are controlled via the step switch 188 and control device 189 in response to a signal received via line 18 from frequency control mechanism 12. The speeds of shafts 182 are preferably related by the ratio $R = r^{1/n}$ where $r$ is the ratio already defined, by which adjacent shafts 162 are related, and $n$ is the number of shafts 182. Suitable combinations of gear selections in gear trains 160 and 180 then provide a relatively large number of speeds, covering a wide range at relatively closely spaced intervals and forming a single uniform geometrical progression with overall ratio $R$.

With that preferred type of discrete speed selection, the range of variation of continuously variable speed mechanism 140 is required to extend only between the relatively close adjacent steps of gear train 180; which differ by the ratio $R$. The maximum speed range required of shaft 150, to make available any arbitrary output shaft speed within the entire range of gear train 170, is then typically only a small fraction of the uniform speed $x$ of shaft 130. For example, the speed of shaft 150 may be continuously variable from 0 to $(R-1)x$, for example; or from $$-\frac{R-1}{R+1}x \text{ to } +\frac{R-1}{R+1}x$$

If $R = 2^{1/6}$, as represented in FIG. 1, the maximum speeds required of shaft 150 for those two cases, are approximately 19% of $x$ and 8.6% of $x$, respectively. The percentage error contributed to the final speed of output shaft 20 by any inaccuracy in variable speed mechanism 140 is correspondingly reduced.

In operation of the described servo analyzer, switches 36, 66 and 100 are appropriately set for the particular servo 60 to be tested, depending upon whether it is designed to receive an alternating or direct current input signal and whether it supplies output information in alternating or direct current form. For a servo of A.C./A.C. type, which will be discussed first, the switches are set as shown in FIG. 1.

The reference voltage supplied to input potentiometer 30 can then be represented as $E \sin w_c t$, where $E$ is the amplitude and $w_c$ is the carrier frequency of source 50. That voltage is sinusoidally modulated by potentiometer 30 at the test frequency $w$, the value of which is conveniently variable by adjustment of frequency command mechanism 10. The resulting test signal supplied to servo 60 via lines 58 can be represented as $$S_i = A_1 \sin wt \sin w_c t \tag{1}$$

The output signal on lines 61 from servo 60 is typically of the form $$S_o = A_2 \sin (wt + \phi) \sin (w_c t + \psi) \tag{2}$$

where $\phi$ and $\psi$ represent phase shifts produced by the servo in the test frequency and the carrier frequency, respectively.

Phase adjusting device 74 is set to supply to demodulator 72 a reference carrier of the form $\sin (w_c t + \psi)$, thus compensating the phase shift $\psi$ and permitting correct phase-sensitive demodulation of output signal $S_o$. The resulting signal supplied as reference voltage to potentiometer 80 is of the form $$S_o' = A_3 \sin (wt + \phi) \tag{3}$$

Potentiometer 80 sinusoidally modulates that signal at the test frequency $w$, but at a phase that differs from the phase $S_i$ by the variable angle set in at differential 44 by adjustment of phase command device 48. Designating that angle $\phi_0$, the two signals produced at the sine and cosine outputs of potentiometer 80 can be expressed respectively as:

$$S_s = A_3 \sin (wt + \phi) \sin (wt + \phi_0) \tag{4a}$$

and $$S_c = A_3 \sin (wt + \phi) \cos (wt + \phi_0) \tag{4b}$$

Those signals may also be written in the form:

$$S_s = A_4 \cos (\phi - \phi_0) + A_4 \cos (2wt + \phi + \phi_0) \tag{5a}$$

$$S_c = A_4 \sin (\phi - \phi_0) + A_4 \sin (2wt + \phi + \phi_0) \tag{5b}$$

where $$A_4 = A_3/2 \tag{5c}$$

When signals $S_s$ and $S_c$ are averaged at 86 and 96, respectively, the second terms of Expressions 5a and 5b are eliminated. Hence the signals supplied to output devices 93 and 103 represent the values $$S_{sa} = A_4 \cos (\phi - \phi_0) \tag{6a}$$

and $$S_{ca} = A_4 \sin (\phi - \phi_0) \tag{6b}$$

Phase command 48 is typically set to make $\phi_0$ equal to the phase shift that servo system 60 is intended to produce. The phase error $\Delta \phi = \phi - \phi_0$ is then ordinarily small, so that to a good approximation $$\cos \Delta \phi = 1 \tag{7a}$$

$$\sin \Delta \phi = \Delta \phi \tag{7b}$$

The relation of amplitude $A_4$ to amplitude $A_2$ of the immediate output of the servo is known, for example from Equation 5c and the described calibration of amplifier 70. Therefore the averaged sine component $S_{sa}$, as indicated at 93, provides a useful direct measure of the amplitude response of the servo system under the test conditions; and $S_{ca}$, as indicated at 103, provides a useful direct measure of the phase error $\Delta \phi$.

If servo system 60 is of a type that accepts a control signal of direct current form, switch 36 is shifted to lower position, supplying a direct current reference voltage to sine-cosine potentiometer 30. The input signal to the servo can then be expressed as $$S_i = A_1 \sin wt \tag{1a}$$

If servo system 60 produces an output signal of direct current form, expressible as $$S_o = A_2 \sin (wt + \phi) \tag{2a}$$

switch 66 may be shifted to its lower position, supplying that signal directly to potentiometer 80. Action of the remainder of the system is then as already described.

If the specified phase shift $\phi_0$ for servo system 60 is zero, or if no specified value is available, phase command device 48 may be set to make $\phi_0=0$. The output indication at 93 then represents the in-phase component of the servo response; that at 103 the out-of-phase component. Those components may be utilized in any desired manner. For example, the actual phase shift $\phi$ and amplitude $A_4$ can be computed from them by known methods.

It will be recognized that the demodulation performed by demodulator 72 when the output signal from servo 60 is of alternating current form may be performed, if preferred, after modulation of the signal by electromechanical device 80. It is then necessary, however, to provide two demodulators and associated switches, one for each of the signals obtained at 81 and 83.

When the signal supplied to either of the modulating devices 30 and 80 is of alternating current form, the sine-cosine potentiometer illustrated as modulator may be replaced, if preferred, by an electromagnetic device such as a resolver of conventional construction, the input signal being supplied typically to a rotor winding and the sinusoidally modulated outputs being taken from the stator windings. An outstanding advantage, however, in employing potentiometers, as shown, is that they are capable of directly handling signals of direct current form. Direct current servos can thus be analyzed without requiring a complex array of switches, modulators and demodulators which transform the signal unnecessarily between direct and alternating current form.

When servo 60 is of such nature that its output can be taken as the rotation of a shaft, the servo analyzing system of the present invention may be somewhat simplified. Such a modified system is represented in FIG. 2, with test servo at 60a and the output shaft indicated schematically at 200. The previously described sinusoidal modulation of the servo output, in definite phase relation to the input test signal, can then be accomplished by an ordinary rotary potentiometer 210 driven from shaft 200 and supplied with a suitable reference voltage. Such voltage may be derived from input sine-cosine potentiometer 30, suitable impedance isolation being provided in conventional manner if desired to reduce loading of that potentiometer. The wiper of potentiometer 210 is preferably driven from shaft 200 via a differential device, indicated schematically at 212, by which any desired phase difference $\phi_0$ may be introduced by suitable manipulation of the shaft 42. That shaft and differential 212 correspond generally to shaft 42 and differential device 44 of FIG. 1. To obtain a measure of in-phase servo response, the reference voltage supplied to potentiometer 210 may be taken from the same terminal of sine-cosine potentiometer 30 that supplies the test signal to servo 60a, as via the line 214 and the switch 216 in the position illustrated. To obtain a measure of the out-of-phase servo response, switch 216 is shifted to connect line 214 to potentiometer terminal 33. Those portions of the embodiment of FIG. 2 that are not explicitly shown may be substantially as already described in connection with FIG. 1.

The signal tapped from potentiometer 210 can be expressed as $S_s$ or $S_c$, given by Equations 4a and 4b, above, according to the position of switch 216. That signal may be supplied via the line 218 to averaging and evaluating circuitry 84a, which may be closely similar to that already described at 84 of FIG. 1. If the servo input signal at 31 is of alternating current form, as when switch 36 of FIG. 1 is in upper position, means are provided to demodulate the output signal with attention to the carrier phase. That may be done by inserting a demodulator such as 72 of FIG. 1 at any desired point between switch 216 and evaluating mechanism 84a.

Switching means such as switch 66 of FIG. 1 may be provided to facilitate convenient insertion of such demodulator in line 214 or in line 218.

In the system of FIG. 2, simultaneous indication of the in-phase and out-of-phase components may be obtained by duplicating potentiometer 210 and evaluating circuitry 84a, and supplying the signals from 31 and 33 as reference voltages to the respective potentiometers.

I claim:

1. Mechanism for testing a servo system or the like, comprising in combination means for supplying as input to the servo system a test signal that varies sinusoidally at a test frequency, means for deriving from the servo system a response signal that constitutes a measure of the servo response to said input, means for modulating the response signal sinusoidally at the test frequency, means actuable to continuously vary the phase relation of said modulation with respect to said sinusoidal variation of said input, and means for producing an output signal proportional to the time average of the magnitude of the modulated response signal.

2. Mechanism for testing a servo system or the like, comprising in combination means for supplying as input to the servo system a test signal that varies sinusoidally at a test frequency, means for deriving from the servo system a response signal that constitutes a measure of the servo response to said input, means for modulating the response signal sinusoidally at the test frequency and in definite phase relation to the variation of said input to produce one component signal, means for modulating the response signal sinusoidally at the test frequency and 90° out of phase with the first said modulation to produce a second component signal, means actuable to continuously and equally vary the phase relation of both said modulations with respect to said sinusoidal variation of said input, and means for producing two output signals that constitute measures of the time averages of the magnitude of the respective component signals.

3. Mechanism for testing a servo system or the like, comprising the combination of means for supplying as input to the servo system a carrier wave having a carrier frequency and modulated sinusoidally at a test frequency, means for deriving as response signal from the servo system a carrier wave of said carrier frequency modulated in accordance with the response of the servo system to said input, means for modulating the response signal sinusoidally at the test frequency and in definite phase relation to the input modulation to produce a component signal, means for demodulating the component signal under phase control of the carrier frequency, and means for producing an output signal that constitutes a measure of the time average of the magnitude of the demodulated component signal.

4. Mechanism for testing a servo system or the like, comprising the combination of two electromechanical modulating devices which modulates an input voltage with a sinusoidal function of a driven rotational angle, means for driving the two modulating devices at a common test frequency, means for supplying a constant input voltage to one modulating device, means for supplying the output from said one modulating device as test voltage to the servo system, means for supplying as input voltage to the other modulating device a voltage derived from the servo system output, and means for producing an output signal that constitutes a measure of the time average of the magnitude of the output from said other modulating device.

5. Mechanism for testing a servo system or the like, comprising the combination of two sine potentiometers, means for driving the two potentiometers at a common test frequency, means for supplying a constant reference voltage to one potentiometer, means for supplying the output voltage from said one potentiometer as test voltage to the servo system, means for supplying as reference voltage to the other potentiometer a voltage derived from the servo system output, and means for producing an output signal that constitutes a measure of the time average of the magnitude of the output from said other potentiometer.

6. Mechanism as defined in claim 5 and including also means for continuously varying the phase relation between the two potentiometers.

7. Mechanism as defined in claim 4 and wherein said means for driving the two modulating devices comprises an input shaft, an output shaft connected to the modulating devices to drive the same at equal speeds, means for driving the input shaft at a constant reference speed, a plurality of gear means connected to one of said shafts and driven thereby at respective speeds that form a geometrical progression with ratio R, clutch means selectively engageable between the other shaft and a selected one of said gear means, an auxiliary shaft, differential means interconnecting the auxiliary shaft between the input shaft and said gear means, and means actuable to drive the auxiliary shaft at a speed that is continuously variable over a speed range that is approximately equal to R–1 times said reference speed.

References Cited by the Examiner

UNITED STATES PATENTS

| | | | |
|---|---|---|---|
| 2,419,462 | 4/47 | Petch et al. | 322—40 |
| 2,747,162 | 5/56 | Attura | 324—158 |
| 2,837,718 | 6/58 | Catherall | 324—158 |
| 2,883,611 | 4/59 | Fuge | 322—40 |
| 2,950,616 | 8/60 | Blomqvist | 324—158 |

WALTER L. CARLSON, *Primary Examiner.*

SAMUEL BERNSTEIN, *Examiner.*